Oct. 6, 1959 — E. J. SIMANEK — 2,907,413
BRAKE RELEASE MEANS
Filed Dec. 27, 1955
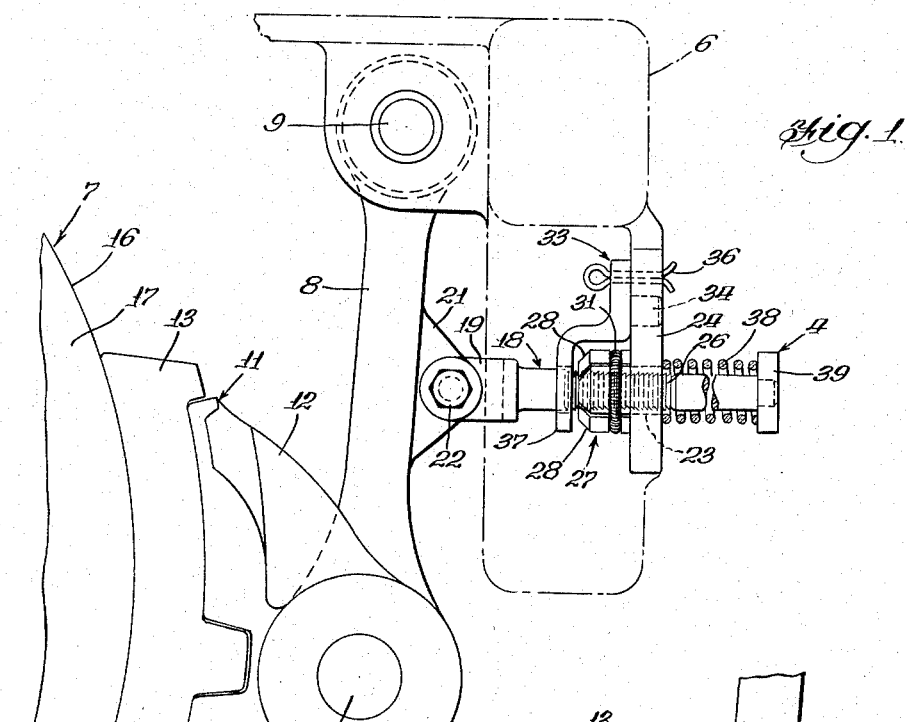
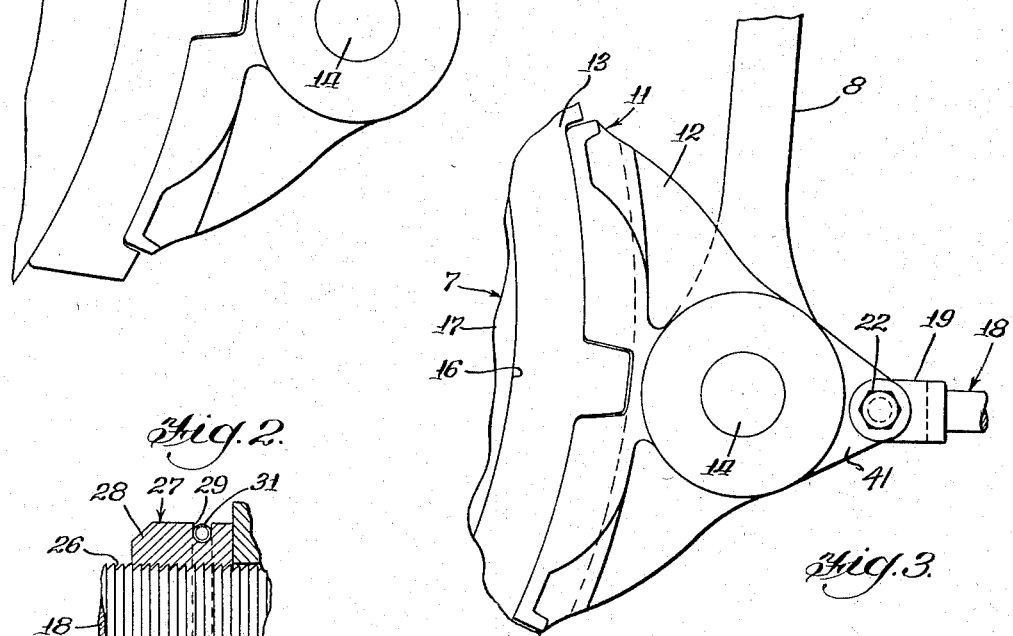
INVENTOR.
Edward J. Simanek
By Walter L. Schlegel, Jr.
Atty.

United States Patent Office 2,907,413
Patented Oct. 6, 1959

2,907,413

BRAKE RELEASE MEANS

Edward J. Simanek, Homewood, Ill., assignor to American Steel Foundries, Chicago, Ill., a corporation of New Jersey Application December 27, 1955, Serial No. 555,406

1 Claim. (Cl. 188—74)

This invention relates to brake release means for railway car trucks and more particularly to means for moving a brake shoe out of braking engagement with the tread surface of a wheel.

In conventional railway brake rigging, brake hangers are pivotally mounted on a truck frame to swingably support brake head-shoe assemblies for movement into and out of braking engagement with their respective wheels. As a result of wear of the wheels and brake shoes, the arc of swinging movement of the brake hanger between its release and braking positions is gradually increased and it is desirable to provide means to limit the extent of such movement.

It is, therefore, an object of the invention to provide a brake release means effective to automatically limit the extent of swinging movement of a brake hanger as the wheel and brake shoe associated therewith become worn away.

Another object of the invention resides in the provision of a brake release means interposed between a brake hanger and a truck frame effective to limit arcuate movement of a brake shoe toward and away from its respective wheel tread surface.

A further object of the invention resides in the provision of a brake release means embodying a clutch mechanism automatically operable to limit movement of a brake shoe away from its associated wheel, whereby the spacing between the wheel and the shoe in its release position is maintained substantially uniform during wear of the wheel and shoe.

Another object of the invention resides in the provision of a brake release means which is relatively simple and inexpensive in construction and reliable in operation.

The invention embodies other novel features, details of construction and arangement of parts which are hereinafter set forth in the specification and claim and illustrated in the accompanying drawings, wherein:

Figure 1 is a fragmentary side elevational view illustrating a brake release means embodying features of the invention, said means being shown as applied between a truck frame and a brake hanger;

Figure 2 is an enlarged sectional view illustrating the clutch mechanism embodied in the brake release means, and Figure 3 is a side elevational view corresponding to Figure 1, showing a modified form of the invention.

Referring now to the drawing for a better understanding of the invention and more particularly to Figures 1 and 2 therein, the brake release means, indicated generally at 4, is shown as applied to apparatus such as a railway car truck comprising a frame 6 supported upon wheel and axle assemblies 7. A brake hanger 8 is pivotally connected to the frame 6 by means of a pivot element 9 and depends downwardly therefrom to support a conventional brake head-shoe assembly 11 comprising a brake head 12 having a brake shoe 13 detachably connected thereto by means of a conventional key (not shown).

The brake head 12 is pivotally connected to the hanger 8 by means of a bolt 14, and a suitable conventional friction means (not shown) is provided to yieldably resist pivotal movement of the assembly relative to the hanger. The brake hanger 8 forms part of a conventional brake rigging, including a brake lever (not shown), operable to swing the hanger toward the tread surface 16 of the wheel 17 to move the brake shoe 13 into engagement with said surface.

The brake release means 4 is shown as comprising a pull or tension rod 18 having one end thereof bifurcated to provide spaced arms 19—19 straddling a boss 21 on the brake hanger 8, said arms and boss having aligned apertures to receive a bolt 22. The other end of the pull rod is slidably mounted in an aperture 23 formed in an abutment means or flange 24 provided on the truck frame 6. A buttress thread 26 extends along the medial portion of the pull rod 18 to engage internal buttress threads formed on a clutch 27.

The clutch 27 is shown as comprising a plurality of segments 28 circumferentially spaced around the rod 18 and formed with aligned grooves 29 to seat an endless coil spring 31 which serves to urge the segments into end to end abuting engagement with each other and in threaded engagement with the pull rod. The clutch 27 is engaged against rotational movement on the pull rod 18 by means of a pin 32 secured on and projecting from the abutment flange 24 for sliding engagement in an aperture 32′ formed in one of the segments 28. It will be noted that the buttress threads on the pull rod and clutch are formed to permit axial movement of the clutch 27 relative to the rod in one direction and to resist axial movement in the other direction.

A clutch release plate or abutment means 33 is detachably mounted on the abutment flange 24 by means of a pin 34 and a cotter pin 36, the pin 34 being secured to the plate 33 for slidable engagement in an opening formed in the flange 24, and the cotter pin 36 extending through aligned apertures provided in the plate and flange. The clutch actuating plate 33 is provided with an offset arm 37 having an aperture to slidably receive the pull rod 18, the arm being spaced from the abutment flange 24 to receive the clutch 27 therebetween. A compression spring 38 is mounted on the pull rod 18 and compressed between the abutment flange 24 and an abutment ring 39 secured on the pull rod to yieldably resist movement of the brake hanger 8 toward the wheel 17.

In the operation of the brake release means thus shown and described, the brake hanger 8 forms part of a conventional power operated brake rigging operable to move the brake shoe 13 into engagement with the tread surface 16 of the wheel 17 to decelerate the wheel and axle assembly. During movement of the brake shoe toward the wheel, the spring 38 is compressed between the abutment flange 24 and the abutment ring 39. Upon release of the braking force exerted by the power brake rigging, the spring 38 acts through the pull rod and brake hanger to move the brake shoe away from the wheel until brought to rest by engagement of the clutch 27 against the abutment flange 24.

As the wheel and brake shoe become worn, the arc of travel of the brake hanger 8 gradually increases and causes the clutch 27 to move into abutting engagement against the arm 37 of the clutch actuating plate 33, whereby the clutch is opened and moved axially on the rod a distance of one thread away from the hanger to thus decrease the arc of travel of the hanger when the latter is moved away from the wheel to its brake release position. During wear of the wheel and brake shoe, the clutch is caused to move axially one thread at a time away from the hanger to maintain a substantially constant spacing between the wheel tread surface and the brake shoe when the clutch 27 is in abutting engagement against the abutment flange 24.

It will be understood that circular ridges and grooves could be formed on the push rod and clutch, in place of the buttress threads, in which event the pin 32 could be omitted, as rotational movement of the clutch on the push rod would not result in axial movement of the clutch along the rod. It will also be noted that the spacing between the clutch actuating plate 33 and the clutch determines the spacing between the wheel and the brake shoe.

Figure 3 illustrates a modified form of the invention in which the hanger 3 is provided with a boss 41 at its lower end to be straddled by the arms 19—19 of the pull rod 18, the arms being connected to the boss by a bolt 22. This form of the invention is otherwise similar to the form heretofore described in connection with Figures 1 and 2 in the drawing.

I claim:

In a brake arrangement for apparatus having a frame, a rotatable brake surface, and brake means movable toward the surface for engagement therewith to apply the brake; the combination of: spaced mutually facing abutments on the frame, one of said abutments facing the surface, a tension rod extending through aligned openings of said abutments and having a connection to said brake means at a fixed point thereon, clutch means sleeved on the rod and releasably clutching the rod, said clutch means being engageable with said one abutment to limit said movement of said rod away from said surface, said clutch means being spaced from the other abutment and being engageable therewith to release said clutch means with respect to said rod, and spring means sleeved on the rod compressed between said frame and an abutment surface of the rod to release the brake means from said surface when the brake is not applied.

References Cited in the file of this patent

UNITED STATES PATENTS

| | | |
|---|---|---|
| 1,109,837 | Harding | Sept. 8, 1914 |
| 1,143,705 | Hedgcock | June 22, 1915 |
| 1,980,329 | Farmer | Nov. 13, 1934 |
| 2,057,749 | Tatter | Oct. 20, 1936 |
| 2,364,664 | Schnell | Dec. 12, 1944 |
| 2,788,095 | Brooks | Apr. 9, 1957 |

FOREIGN PATENTS

| | | |
|---|---|---|
| 890,969 | France | Nov. 19, 1943 |